(12) United States Patent
Ioki

(10) Patent No.: US 12,011,116 B2
(45) Date of Patent: Jun. 18, 2024

(54) DEVICE CONTROL SYSTEM, DEVICE CONTROL METHOD, AND NON-TRANSITORY COMPUTER READABLE MEDIUM FOR RECIPE

(71) Applicant: Cookpad Inc., Tokyo (JP)

(72) Inventor: Masayuki Ioki, Tokyo (JP)

(73) Assignee: COOKPAD INC., Tokyo (JP)

( * ) Notice: Subject to any disclaimer, the term of this patent is extended or adjusted under 35 U.S.C. 154(b) by 738 days.

(21) Appl. No.: 17/100,967

(22) Filed: Nov. 23, 2020

(65) Prior Publication Data

US 2021/0113027 A1 Apr. 22, 2021

Related U.S. Application Data

(63) Continuation of application No. PCT/JP2019/019156, filed on May 14, 2019.

(30) Foreign Application Priority Data

May 22, 2018 (JP) .................. 2018-098184

(51) Int. Cl.
*A47J 44/00* (2006.01)
*G06F 9/448* (2018.01)
(Continued)

(52) U.S. Cl.
CPC ............ *A47J 44/00* (2013.01); *G06F 9/4498* (2018.02); *G06F 16/9024* (2019.01); *G06F 40/289* (2020.01)

(58) Field of Classification Search
CPC .. G06F 9/4498; G06F 16/9024; G06F 40/289; G06F 21/6218; G06F 21/31; G06F 16/2455; G06F 19/3475; A47J 44/00
See application file for complete search history.

(56) References Cited

U.S. PATENT DOCUMENTS

2012/0019674 A1 1/2012 Ohnishi et al.
2015/0074237 A1* 3/2015 Unagami ............ H05B 6/6435
    709/219
(Continued)

FOREIGN PATENT DOCUMENTS

JP 2002-310432 A 10/2002
JP 2006-250510 A 9/2006
(Continued)

OTHER PUBLICATIONS

International Search Report and Written Opinion dated Jul. 16, 2019, received for PCT Application No. PCT/JP2019/019156, filed on May 14, 2019, 11 pages including English Translation.

(Continued)

*Primary Examiner* — Brian W Jennison
(74) *Attorney, Agent, or Firm* — XSENSUS LLP

(57) ABSTRACT

A device control system that includes a memory, and processing circuitry that acquires recipe data of a culinary dish, the recipe data being represented by a graph including a plurality of nodes and edges between the nodes, and processes the acquired recipe data for controlling a device, and the plurality of nodes include an ingredient node that represents an ingredient of the culinary dish, and a culinary dish node that represents the culinary dish, the edge represents an action that is necessary for state transition between the nodes, an ingredient ID that uniquely identifies the ingredient is assigned to the ingredient node, an action ID that uniquely identifies the action is assigned to the edge, and the processing circuitry controls the device based on the acquired recipe data.

14 Claims, 13 Drawing Sheets

(51) Int. Cl.
    *G06F 16/901*     (2019.01)
    *G06F 40/289*     (2020.01)

(56) References Cited

U.S. PATENT DOCUMENTS

| | | | |
|---|---|---|---|
| 2015/0290795 A1* | 10/2015 | Oleynik | B25J 9/0081 |
| | | | 700/257 |
| 2016/0314311 A1* | 10/2016 | Jiang | G06F 21/36 |
| 2018/0330295 A1* | 11/2018 | An | G06Q 10/06311 |

FOREIGN PATENT DOCUMENTS

| | | |
|---|---|---|
| JP | 2009-054042 A | 3/2009 |
| JP | 2015-52968 A | 3/2015 |
| JP | 2017-507377 A | 3/2017 |
| WO | 2011/065028 A1 | 6/2011 |

OTHER PUBLICATIONS

Takano et al., "Cooking Studio: Cooking Simulation from Web Recipes", Generation of Scenario and Cooking Scheduling, Jun. 18, 2004, 22 pages including English Translation.

Maeta et al., "A Framework for Procedural Text Understanding", Proceedings of the 14th International Conference on Parsing Technologies, Jul. 2015, 11 pages.

\* cited by examiner

DEVICE CONTROL SYSTEM, DEVICE CONTROL METHOD, AND NON-TRANSITORY COMPUTER READABLE MEDIUM FOR RECIPE

CROSS-REFERENCE TO RELATED APPLICATIONS

This application is a continuation of International Patent Application No. PCT/JP2019/019156, filed on May 14, 2019, which claims priority from Japanese Patent Application No. 2018-098184, filed on May 22, 2018, both of which are incorporated by reference herein in its entirety.

TECHNICAL FIELD

The present disclosure relates to a device control system, a server apparatus, a device control method, a program and a data structure for a recipe.

BACKGROUND

In recent years, application of the IoT (Internet of Things) to household electrical appliances is increasing, and network-compatible devices such as smart household electrical appliances have been appearing. In order to utilize such devices for saving labor when cooking, studies are being conducted to realize machine-readable recipe data and to control devices based on such recipe data. In Non Patent Literature 1, in relation to research concerning natural language processing that causes a machine to process natural language, a method is described which segments a recipe sentence into words that represent a cooking appliance or an action (an operation relating to cooking), estimates the relationship between the words, and creates a graph (recipe data) in which each word is taken as a node and the relationship between words is taken as an edge.

CITATION LIST

Non Patent Literature

Non Patent Literature 1: Hirokuni Maeta, Tetsuro Sasada, Shinsuke Mori, "A Framework for Procedural Text Understanding", [online], IWPT, 2015 [date of search: Mar. 20, 2018], Internet <URL: http://www.ar.media.kyoto-u.ac.jp/mori/research/public/maeta-IWPT15.pdf>

SUMMARY

The present disclosure provides a device control system, comprising: a memory; and processing circuitry configured to acquire recipe data of a culinary dish, the recipe data being represented by a graph including a plurality of nodes and edges between the nodes; store, in the memory, the acquired recipe data; and process the acquired recipe data for controlling a device, wherein the plurality of nodes include an ingredient node that is a starting point of the graph and that represents an ingredient of the culinary dish, and a culinary dish node that is an ending point of the graph and that represents the culinary dish, the edge represents an action that is necessary for state transition between the nodes, an ingredient ID that uniquely identifies the ingredient is assigned to the ingredient node, an action ID that uniquely identifies the action is assigned to the edge, and the processing circuitry is further configured to control the device based on the acquired recipe data represented by the graph including the ingredient node having the ingredient ID, the culinary dish node, and the edges each having the action ID.

DETAILED DESCRIPTION

Technical Problem

Figure 1:
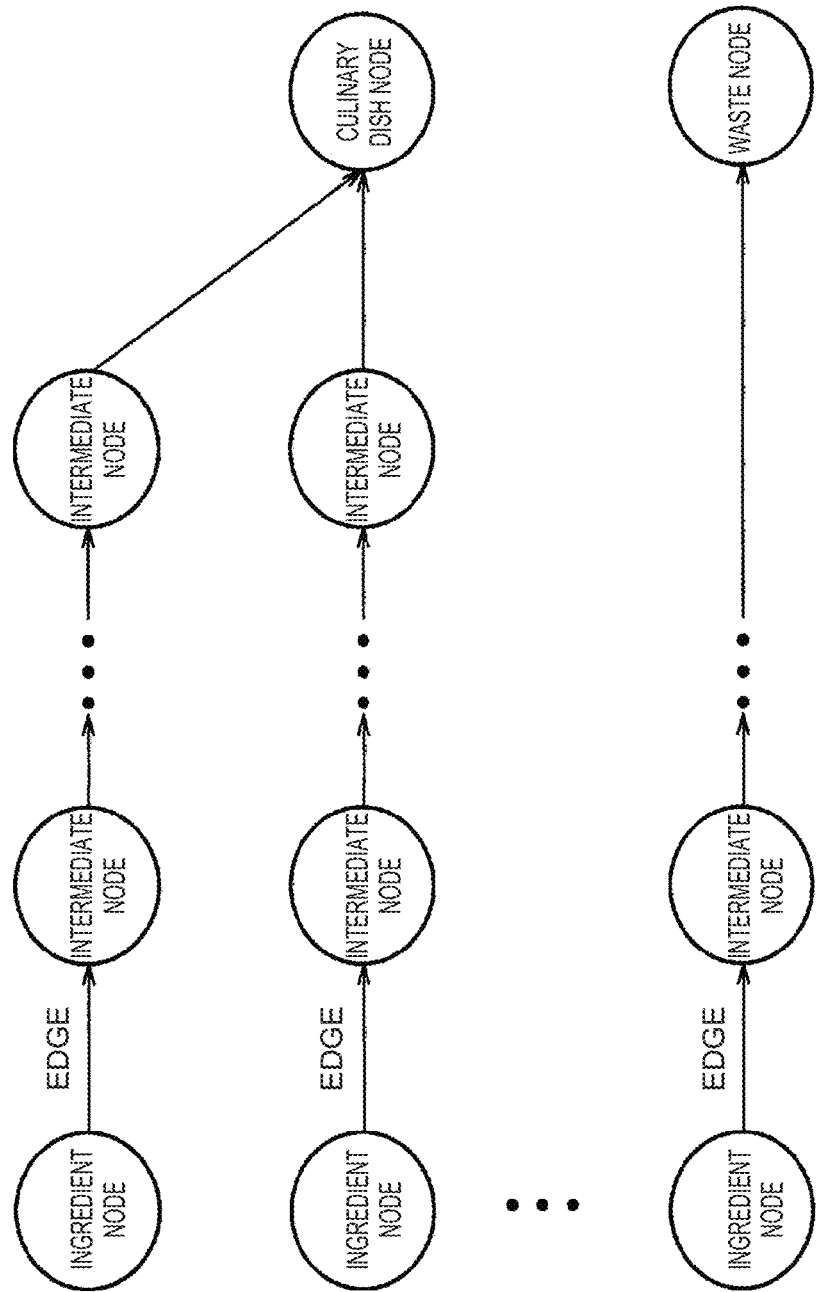
FIG. 1 is a view illustrating a data structure for a recipe according to a first to a third embodiment.

However, the recipe data described in Non Patent Literature 1 is data in which the description of a recipe sentence that is natural language is represented as it is as a graph, and it is based on the premise that the recipe sentence will be read by a human, and therefore the machine readability of the recipe data is low and there is a concern that it will not be possible for the recipe data to be appropriately read by a machine.

Further, since the recipe data disclosed in Non Patent Literature 1 is described centering on actions to be performed by a human, and the cooking appliances to be used are designated in some cases, there is a limit to the devices that can be supported, and supporting various kinds of devices including new devices that will appear in the future is difficult.

Therefore, an object of the present disclosure is to provide a device control system, a server apparatus, a device control method, a program, and a data structure for a recipe which enable the control of various kinds of devices using recipe data that has a high level of machine readability.

Solution to Problem

A device control system according to a first feature is a device control system that controls a device, and includes:

an acquisition section that acquires recipe data represented by a graph composed of a plurality of nodes and edges between nodes; and a processing section that performs processing for controlling the device by reading the acquired recipe data. The plurality of nodes include an ingredient node that is a starting point of the graph and that represents an ingredient of a culinary dish, and a culinary dish node that is an ending point of the graph and that represents the culinary dish. The edge represents an action that is necessary for state transition between nodes. An ingredient ID that uniquely identifies the ingredient is assigned to the ingredient node. An action ID that uniquely identifies the action is assigned to the edge.

A server apparatus according to a second feature is a server apparatus for controlling a device, and includes an acquisition section that acquires recipe data represented by a graph composed of a plurality of nodes and edges between nodes; and a processing section that performs processing for controlling the device by reading the acquired recipe data. The plurality of nodes include an ingredient node that is a starting point of the graph and that represents an ingredient of a culinary dish, and a culinary dish node that is an ending point of the graph and that represents the culinary dish. The edge represents an action that is necessary for state transition between nodes. An ingredient ID that uniquely identifies the ingredient is assigned to the ingredient node. An action ID that uniquely identifies the action is assigned to the edge.

A device control method according to a third feature is a device control method for controlling a device, including: a step of acquiring recipe data that is represented by a graph composed of a plurality of nodes and edges between nodes; and a step of performing processing for controlling the device by reading the acquired recipe data. The plurality of nodes include an ingredient node that is a starting point of the graph and that represents an ingredient of a culinary dish, and a culinary dish node that is an ending point of the graph and that represents the culinary dish. The edge represents an action that is necessary for state transition between nodes. An ingredient ID that uniquely identifies the ingredient is assigned to the ingredient node. An action ID that uniquely identifies the action is assigned to the edge.

A program according to a fourth feature causes a computer to execute a step of acquiring recipe data that is represented by a graph composed of a plurality of nodes and edges between nodes; and a step of performing processing for controlling a device by reading the acquired recipe data. The plurality of nodes include an ingredient node that is a starting point of the graph and that represents an ingredient of a culinary dish, and a culinary dish node that is an ending point of the graph and that represents the culinary dish. The edge represents an action that is necessary for state transition between nodes. An ingredient ID that uniquely identifies the ingredient is assigned to the ingredient node. An action ID that uniquely identifies the action is assigned to the edge.

A data structure for a recipe according to a fifth feature is a data structure for a recipe in a device control system that includes: an acquisition section that acquires recipe data; and a processing section that performs processing for controlling a device by reading the acquired recipe data. The recipe data is represented by a graph composed of a plurality of nodes and edges between nodes. The plurality of nodes include an ingredient node that is a starting point of the graph and that represents an ingredient of a culinary dish, and a culinary dish node that is an ending point of the graph and that represents the culinary dish. The edge represents an action that is necessary for state transition between nodes. An ingredient ID that uniquely identifies the ingredient is assigned to the ingredient node. An action ID that uniquely identifies the action is assigned to the edge.

Advantageous Effect of Disclosure

According to the present disclosure, a device control system, a server apparatus, a device control method, a program, and a data structure for a recipe which enable control of various devices using recipe data having a high level of machine readability can be provided.

A device control system according to the embodiments is described hereunder referring to the accompanying drawings. In the drawings referred to below, the same or like parts are denoted by the same or like reference symbols.

OUTLINE OF EMBODIMENTS

A device control system according to the embodiments is a system for controlling a device. A device that is a control object is a device that relates to an ingredient of a culinary dish or to cooking using the ingredient. The device control system according to the embodiments acquires recipe data, and performs processing for controlling a device by reading the acquired recipe data. In a case where an apparatus (for example, a server apparatus or a terminal apparatus) other than the device reads the recipe data, the processing for controlling the device may include processing for generating and transmitting a command (hereinafter, referred to as "control command") for controlling the device. In a case where the recipe data is read by the device itself, processing for controlling the device may include processing for performing an action in accordance with the recipe data.

FIG. 1 is a view illustrating a data structure for a recipe according to the embodiments. As illustrated in FIG. 1, the recipe data according to the embodiments is represented by a graph (directed graph) composed of a plurality of nodes and edges between the nodes. In FIG. 1, each node is indicated by a circle, and each edge is indicated by an arrow.

The plurality of nodes define a state transition for each ingredient. An edge represents an action that is necessary for state transition between nodes. The term "action" refers to a basic process constituting a part of cooking, and for example a process such as "cut" or "heat" corresponds to an action. The kinds of actions and the respective IDs of the actions are defined in advance, or alternatively IDs are assigned to the kinds of action after the fact, and a list of actions and the IDs thereof is defined, and an action ID selected from the list is assigned to an edge. Note that, an ID may also be assigned to a state (intermediate node).

The plurality of nodes within the graph include an ingredient node that is a starting point of the graph and that represents an ingredient of a culinary dish, a culinary dish node that is an ending point of the graph and that represents the culinary dish, and an intermediate node that represents a state of an ingredient during the process of arriving at the culinary dish. The term "ingredient" refers to an ingredient for making the culinary dish, and items such as seasoning or items which are discarded during the course of cooking may be included in the meaning of the term "ingredient". The kinds of ingredients and the IDs of the ingredients are specified in advance, and a list of the ingredients and the IDs of the ingredients is defined and an ingredient ID that is selected from the list is assigned to an ingredient node. The term "state of an ingredient" refers to a state after an action is performed, and for example the phrases "ingredient A that was cut into three equal sections", "ingredient B that was cut into 3-cm cubes", and "ingredient C that was heated" correspond to a state of an ingredient.

Thus, the data structure for a recipe according to the embodiments is not a data structure that represents the description of a recipe sentence that is natural language as it is as a graph, but is a data structure that represents a state transition of each ingredient as a graph. Each ingredient is assigned an ingredient ID that uniquely identifies the ingredient, and each action that is necessary for state transition is assigned an action ID that uniquely identifies the action. Hence, a machine can easily and reliably read the recipe data based on the IDs. Further, since it is not necessarily required to specify a device that should perform an action with respect to the recipe data, it is easy to support various kinds of devices including new devices that will appear in the future. In addition, because the respective actions are all represented as edges, it is easy to extract the respective actions from the recipe data.

The kinds of nodes in the recipe data according to the embodiments are illustrated in Table 1.

TABLE 1

| Kind of Node | Description |
| --- | --- |
| Ingredient Node | Represents an ingredient of the culinary dish, and the graph starts from this node. An ingredient ID is required. |
| Intermediate Node | Has IN and OUT edges, and represents an intermediate state of the culinary dish. |
| Waste Node | Represents a peeled skin or the like. Is one of the terminal nodes, but does not represent a culinary dish. |
| Culinary Dish Node | Terminal node that represents a culinary dish. |
| Special Node | Preliminary node for a device, such as heating an oven. |

It is possible to assign an attribute as shown, for example, in Table 2, to each node as an attribute of the node. Here, it is assumed that the node is an ingredient node, and the ingredient node represents a "carrot".

TABLE 2

| Attribute of Node | Example |
| --- | --- |
| State | Raw |
| Name | Carrot (or ingredient ID) |
| Quantity | Quantity (weight) of ingredient |

Note that, "Name" is information that is necessary in order for a human to create and read an MRR, and it is not necessarily required for "Name" to be machine readable.

It is possible to assign an attribute as shown in Table 3 to each edge, as an attribute of the edge.

TABLE 3

| Attribute of Edge | Description |
| --- | --- |
| Name | Action name such as "cut" or "heat" |
| Action ID | ID corresponding to action name |
| Ending Condition | Cut into "3-cm cubes", boiling well for "5 minutes" or the like. Condition for ending action. |
| Device | ID representing device such as "oven" or "microwave oven" |
| Order Among Edges | Number indicating order in which action is executed |

Here, a specific example of each node will be given and described. In the case of preparing a "salad" as a culinary dish, the culinary dish node is "salad". Further, the ingredient nodes are, for example, "onion", "cucumber", "tomato", "ketchup" and "mayonnaise". An ID that uniquely identifies the relevant ingredient is assigned to each ingredient node.

The ingredient node "onion" is connected to an intermediate node "finely chopped onion" by "cut" that is an edge (action). Further, the ingredient node "cucumber" is connected to an intermediate node "cucumber in a size of 1 cubic centimeter" by "cut" that is an edge (action). In addition, the ingredient node "tomato" is connected to an intermediate node "½ tomato" by "cut" that is an edge (action). Furthermore, the ingredient node "ketchup" and the ingredient node "mayonnaise" are connected to an intermediate node "aurora sauce" by "mix" that is an edge (action). Note that, an ID for uniquely identifying the action is assigned to "cut" and "mix", respectively.

The intermediate nodes "finely chopped onion", "cucumber in a size of 1 cubic centimeter" and "½ tomato" are connected by "arrange on a plate" that is an edge (action) to the culinary dish node "salad". Further, the intermediate node "aurora sauce" is connected by "pour over" that is an edge (action) to the culinary dish node "salad". Note that, "arrange on a plate" and "pour over" are each assigned an ID that uniquely identifies the relevant action. Further, the order among the edges is set so that "pour over" is performed next after "arrange on a plate". Note that, an action "mix together" may be used instead of "pour over".

First Embodiment

A first embodiment of a device control system that uses the data structure for a recipe which is described above will now be described.

(System Configuration According to First Embodiment)

Figure 2:
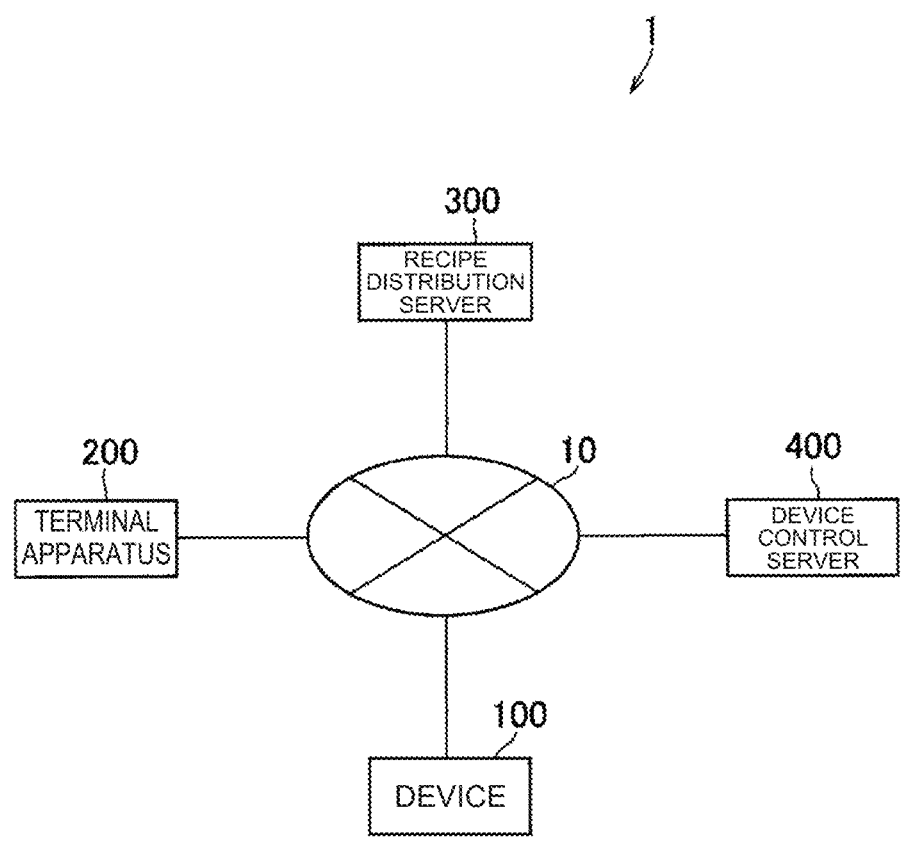
FIG. 2 is a view illustrating the configuration of a device control system according to the first to third embodiments.

The configuration of a device control system 1 according to the first embodiment will now be described. FIG. 2 is a view illustrating the configuration of the device control system 1 according to the first embodiment.

As illustrated in FIG. 2, the device control system 1 includes a device 100, a terminal apparatus 200, a recipe distribution server 300, and a device control server 400. The device 100, the terminal apparatus 200, the recipe distribution server 300 and the device control server 400 conduct communication with each other through a communication network 10. However, the device 100 may conduct communication directly (for example, short-range radio communication) with the terminal apparatus 200 without communicating by way of the communication network 10.

The device 100 is a device that has a communication function, and that relates to an ingredient of a culinary dish or to cooking that uses the ingredient. The device 100 may be a household electrical appliance device that is used in the home, or may be a device that is used for business purposes. The device 100 may be any device as long as the device relates to an ingredient or to cooking that uses the ingredient, and for example the device 100 is a refrigerator, a microwave oven, an oven, a food processor, a food mixer, a rice cooker, an electric saucepan, an electric fryer, an electric steamer, a noodle making machine, a measuring instrument, or a cooking robot.

The terminal apparatus 200 is an apparatus that has a communication function and that provides a user interface. In accordance with an operation performed by a user, the terminal apparatus 200 acquires recipe data (recipe sentences or image data of a culinary dish or the like) from the recipe distribution server 300, and displays the acquired recipe data. Further, in accordance with an operation performed by a user with respect to a displayed recipe, the terminal apparatus 200 sends a request relating to control of the device 100 to the device control server 400. The terminal apparatus 200 is, for example, a mobile terminal (for example, a tablet computer, a smartphone, a laptop, a feature phone, a portable game device, or an electronic book reader). Alternatively, the terminal apparatus 200 may be a television set (including Internet television), a PC (personal computer), a VR (virtual reality) terminal, an AR (augmented reality) terminal or the like.

The recipe distribution server 300 accumulates recipe data for displaying. In response to a request form the terminal apparatus 200, the recipe distribution server 300 delivers recipe data that matches the request from among the accumulated recipe data to the terminal apparatus 200. The terminal apparatus 200 displays the recipe data acquired from the recipe distribution server 300. The recipe data which the recipe distribution server 300 delivers is mainly constituted by recipe sentences (natural language) which a human is capable of reading, and is not data which a machine reads. Hereinafter, the recipe data in question is referred to as "HRR" (human readable recipe).

The device control server 400 accumulates recipe data for device control that corresponds to the recipe data which the recipe distribution server 300 accumulates. The recipe data for device control has the data structure for a recipe described above (see FIG. 1, and Table 1 to Table 3), and is data which a machine is capable of reading. Hereinafter, the recipe data in question is referred to as "MRR" (machine readable recipe). In response to a request from the terminal apparatus 200, the device control server 400 generates a control command based on the MRR, and transmits the generated control command to the terminal apparatus 200. Specifically, a recipe ID is included in the request from the terminal apparatus 200. The device control server 400 acquires the MRR corresponding to the relevant recipe ID, reads the acquired MRR, and transmits a control command based on the MRR to the terminal apparatus 200. The terminal apparatus 200 transfers the control command received from the device control server 400 to the device 100.

After transferring the control command to the device 100, the user of the terminal apparatus 200 performs an action starting operation with respect to the device 100 to cause the device 100 to start an action that corresponds to the control command. For example, a physical button for accepting an action starting operation is provided in the device 100. Alternatively, a software button for accepting an action starting operation may be displayed on the device 100. Upon accepting the action starting operation, the device 100 starts the action that corresponds to the control command (Hardware Configuration)

Figure 3:
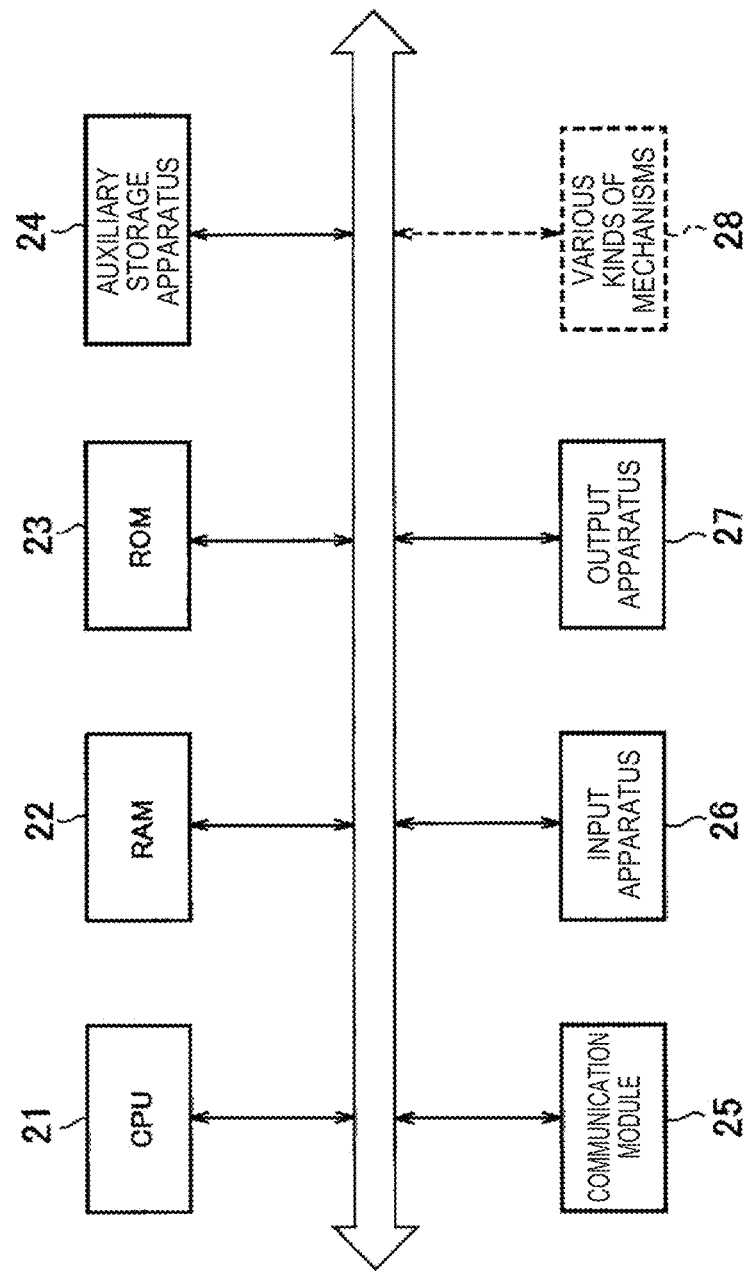
FIG. 3 is a view illustrating the hardware configuration of each device and each apparatus included in the device control system according to the first to third embodiments.

The hardware configuration of each device and each apparatus included in the device control system 1 will now be described. FIG. 3 is a block diagram illustrating an example of the hardware configuration of the device 100, the terminal apparatus 200, the recipe distribution server 300, and the device control server 400.

As illustrated in FIG. 3, the device 100, the terminal apparatus 200, the recipe distribution server 300, and the device control server 400 each include a CPU 21, a RAM 22, a ROM 23, an auxiliary storage apparatus 24, a communication module 25, an input apparatus 26, and an output apparatus 27.

The CPU 21 reads out and executes software (a program) from the RAM 22 and the ROM 23 constituting a main storage device. The RAM 22 is used as a work area of the CPU 21. The auxiliary storage apparatus 24 is constituted by a hard disk or a flash memory or the like. The communication module 25 is a module that transmits and receives data by wired communication or wireless communication. The input apparatus 26 is constituted by a touch panel and/or a keyboard or the like, and accepts operations performed by a user. The input apparatus 26 may accept operations by speech input. The output apparatus 27 is constituted by a display or the like, and outputs (displays) various kinds of information.

By causing hardware such as the CPU 21 and the RAM 22 to read software, the communication module 25, the input apparatus 26, and the output apparatus 27 are actuated under the control of the CPU 21, and by performing reading and writing of data at the RAM 22 and the auxiliary storage apparatus 24, a series of functions is realized at each device and each apparatus.

The device 100 also includes various kinds of mechanisms 28. The various kinds of mechanisms 28 are mechanisms for executing an action at the device 100, and for example are constituted by a heating mechanism, a refrigerating and freezing mechanism, a cutting mechanism, a stirring mechanism or the like.

(Functional Block Configuration of Terminal Apparatus According to First Embodiment)

Figure 4:
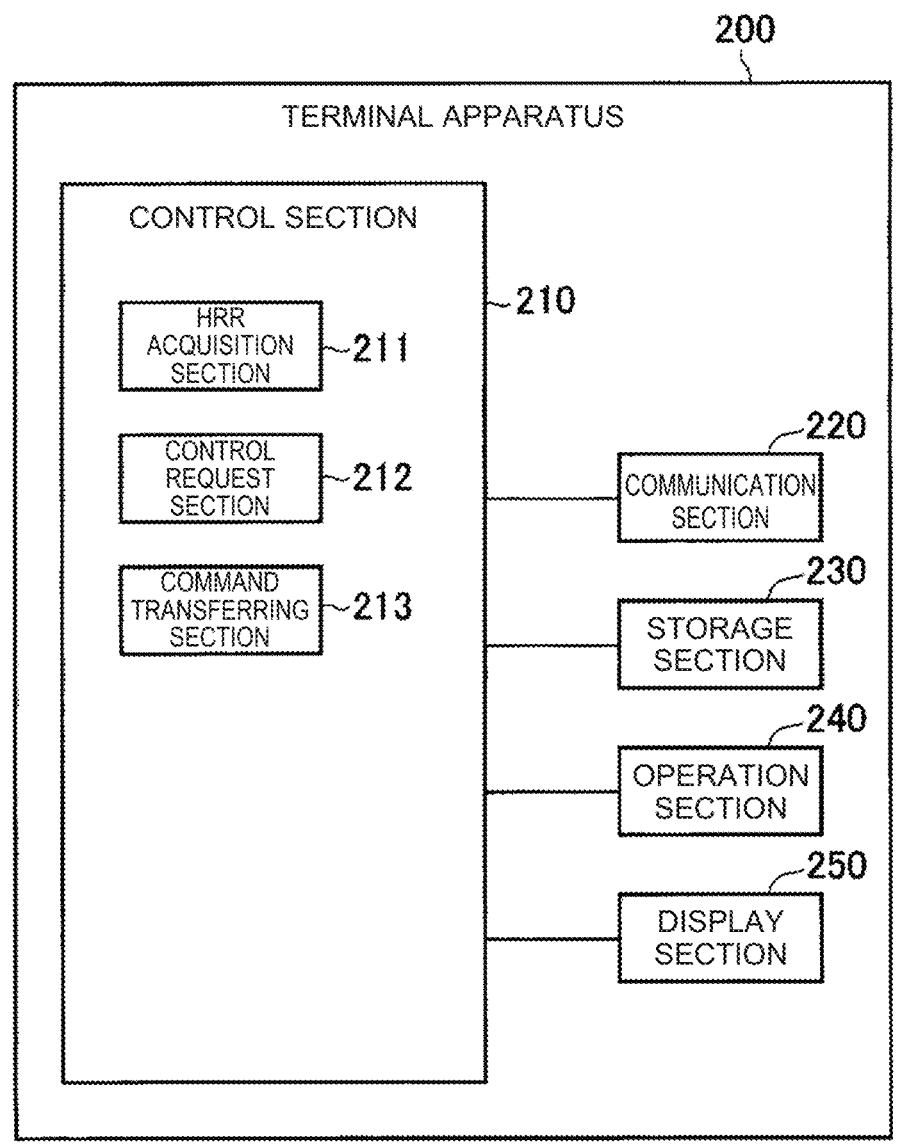
FIG. 4 is a view illustrating a functional block configuration of a terminal apparatus according to the first embodiment.

A functional block configuration of the terminal apparatus 200 according to the first embodiment will now be described. FIG. 4 is a view illustrating the functional block configuration of the terminal apparatus 200 according to the first embodiment.

As illustrated in FIG. 4, the terminal apparatus 200 includes a control section 210, a communication section 220, a storage section 230, an operation section 240 and a display section 250.

The control section 210 is constituted by including the CPU 21, and controls operations of the terminal apparatus 200. The communication section 220 is constituted by including the communication module 25, and conducts communication through the communication network 10. The communication section 220 may have a function that communicates directly with the device 100. The storage section 230 is constituted by including the RAM 22, the ROM 23 and the auxiliary storage apparatus 24, and stores various kinds of information and data. The operation section 240 is constituted by including the input apparatus 26, and accepts user operations. The display section 250 is constituted by including the output apparatus 27 (display), and displays various kinds of information and data.

The control section 210 includes a HRR acquisition section 211, a control request section 212 and a command transferring section 213.

The HRR acquisition section 211 acquires a HRR from the recipe distribution server 300 through the communication section 220 in accordance with an operation performed by the user with respect to the operation section 240. The HRR acquisition section 211 may acquire the HRR of a recipe which the user selected from a list of recipes displayed on the display section 250, and may acquire the HRR that matches a condition by performing search processing with respect to the recipe distribution server 30 using a search condition (a keyword or the like). The HRR acquisition section 211 displays the acquired HRR on the display section 250. A button (hereinafter, referred to as "device control button") for transmitting a control command to the device 100 may be displayed together with the relevant HRR.

In response to the device control button being operated by the user, the control request section 212 generates a control request that requests control of the device 100, and transmits the generated control request to the device control server 400 through the communication section 220. The control request includes a recipe ID corresponding to the selected recipe (HRR). The control request may also include a device ID of the device 100 that is the control object.

The command transferring section 213 receives the control command that was transmitted from the device control server 400, through the communication section 220. The command transferring section 213 transfers the received control command to the device 100 through the communication section 220.

(Functional Block Configuration of Device Control Server According to First Embodiment)

Figure 5:
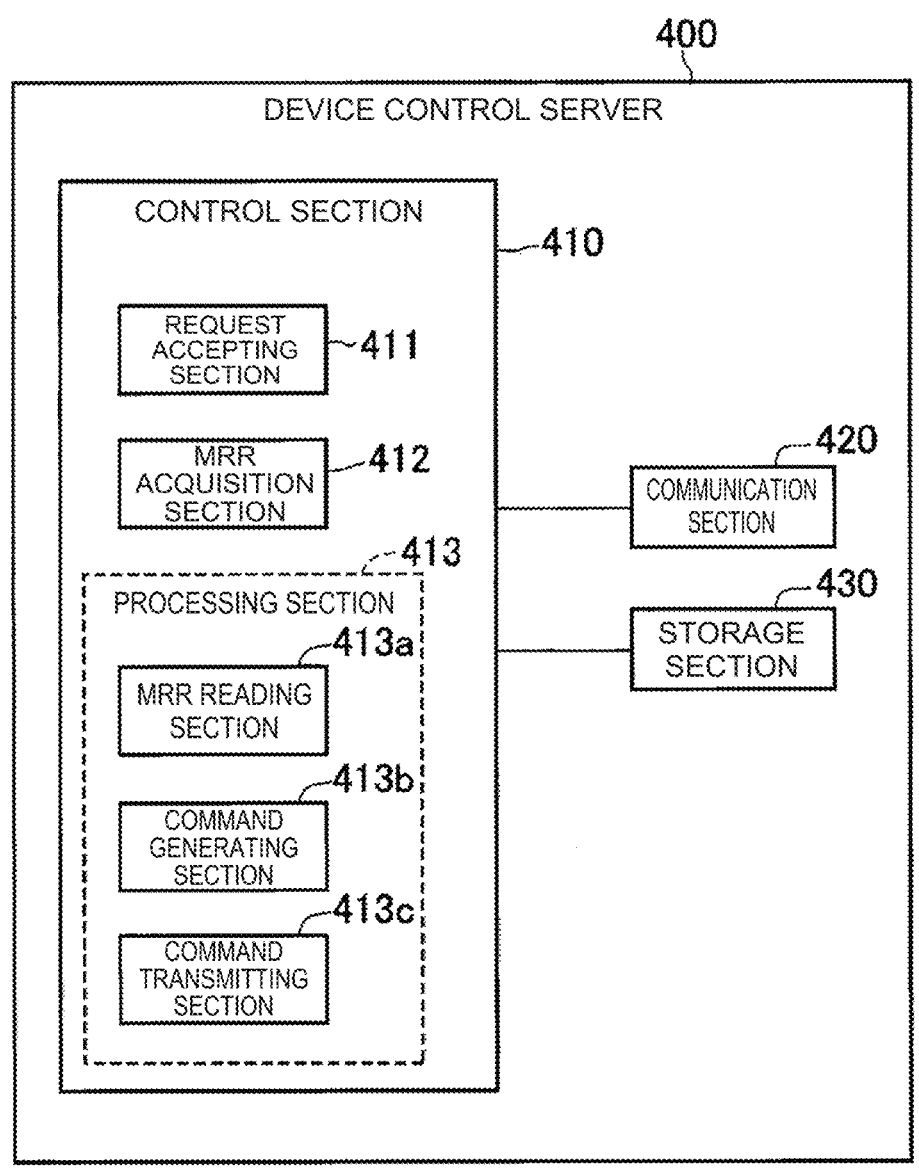
FIG. 5 is a view illustrating a functional block configuration of a device control server according to the first embodiment.

A functional block configuration of the device control server 400 according to the first embodiment will now be described. FIG. 5 is a view illustrating the functional block configuration of the device control server 400 according to the first embodiment.

As illustrated in FIG. 5, the device control server 400 includes a control section 410, a communication section 420 and a storage section 430.

The control section 410 is constituted by including the CPU 21, and controls operations of the device control server 400. The communication section 420 is constituted by including the communication module 25, and conducts communication through the communication network 10. The storage section 430 is constituted by including the RAM 22, the ROM 23 and the auxiliary storage apparatus 24, and stores various kinds of information and data. The storage section 430 also stores MRRs in association with a recipe ID.

The control section 410 includes a request accepting section 411, an MRR acquisition section 412 and a processing section 413.

The request accepting section 411 accepts a control request from the terminal apparatus 200 through the communication section 420. The control request includes a recipe ID corresponding to the selected recipe. The control request may also include the device ID of the device 100 that is the control object.

The MRR acquisition section 412 acquires an MRR corresponding to the recipe ID included in the control request, from the storage section 430.

The processing section 413 reads the MRR acquired by the MRR acquisition section 412, and performs processing for controlling the device 100 corresponding to the device ID included in the control request. The processing section 413 includes an MRR reading section 413a, a command generating section 413b and a command transmitting section 413c.

The MRR reading section 413a reads the MRR acquired by the MRR acquisition section 412.

Based on the result of reading the MRR obtained by the MRR reading section 413a, the command generating section 413b extracts an action (action ID) which the device 100 corresponding to the device ID included in the control request is capable of executing from the MRR, and generates a control command for setting execution of the extracted action. For example, a list of executable actions (action IDs) is defined for each device ID. The list is composed of an ID representing "cut", an ID representing "bake", an ID representing "boil" and the like. By referring to the list, the command generating section 413b extracts an action (action ID) which the device 100 corresponding to the device ID included in the control request is capable of executing from the MRR. Specifically, the command generating section 413b may compare a list of action IDs which are executable by the relevant device and the action ID of each edge in the MRR, extract a matching action ID, and make a determination to designate execution of the action that corresponds to the extracted ID to the relevant device.

The command transmitting section 413c transmits the command which was generated by the command generating section 413b to the terminal apparatus 200 through the communication section 420.

(Functional Block Configuration of Device According to First Embodiment)

Figure 6:
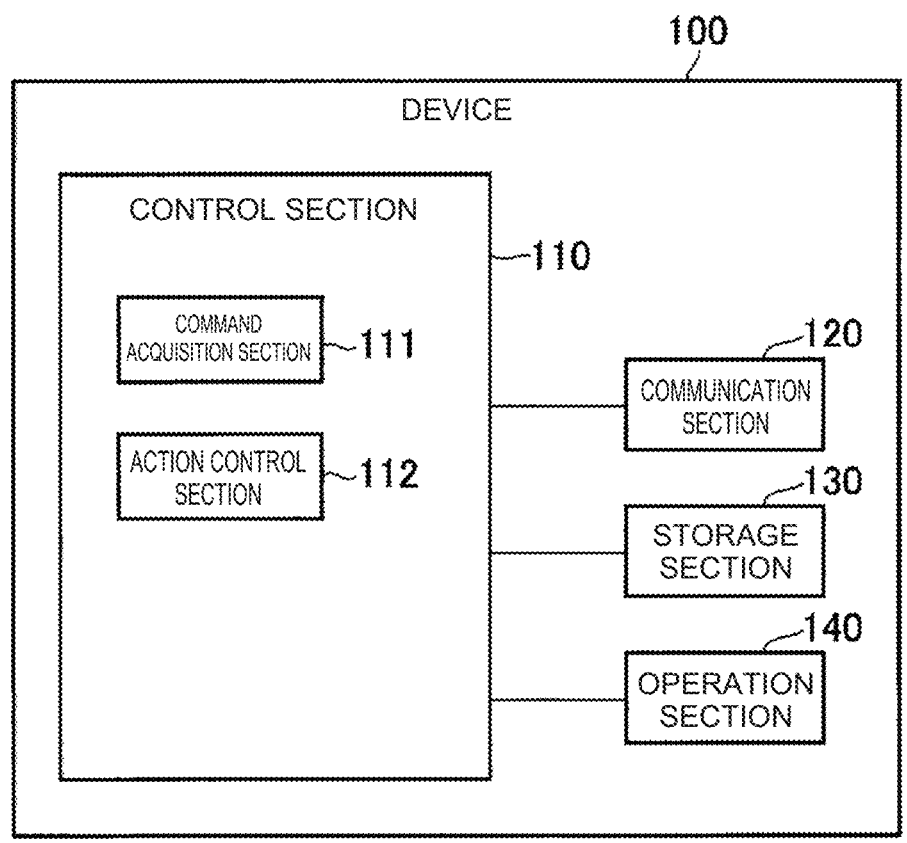
FIG. 6 is a view illustrating a functional block configuration of a device according to the first embodiment.

A functional block configuration of the device 100 according to the first embodiment will now be described. FIG. 6 is a view illustrating the functional block configuration of the device 100 according to the first embodiment.

As illustrated in FIG. 6, the device 100 includes a control section 110, a communication section 120, a storage section 130 and an operation section 140.

The control section 110 is constituted by including the CPU 21, and controls operations of the device 100. The communication section 120 is constituted by including the communication module 25, and conducts communication through the communication network 10. The communication section 120 may have a function that communicates directly with the terminal apparatus 200. The storage section 130 is constituted by including the RAM 22, the ROM 23 and the auxiliary storage apparatus 24, and stores various kinds of information and data. The operation section 140 is constituted by including the input apparatus 26, and accepts user operations. The operation section 140 may have a physical button or a software button for accepting an action starting operation.

The control section 110 includes a command acquisition section 111 and an action control section 112.

The command acquisition section 111 acquires a control command that was transmitted from the terminal apparatus 200, through the communication section 120.

After a control command is acquired by the command acquisition section 111, the action control section 112 controls so as to start an action corresponding to the relevant control command in response to the operation section 140 (action starting button) being operated by the user.

(Example of Operations According to First Embodiment)

Figure 7:
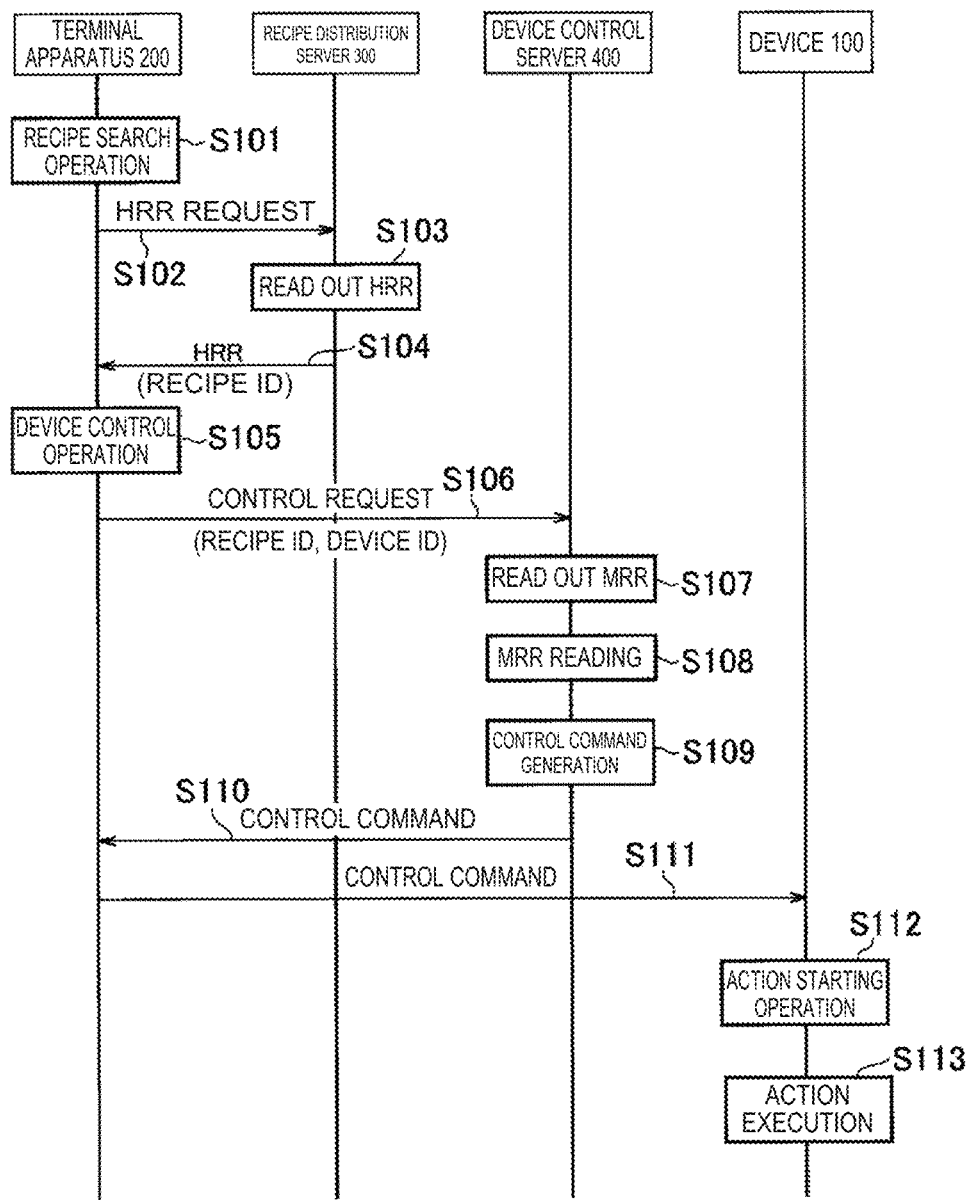
FIG. 7 is a view illustrating an example of operations of the device control system according to the first embodiment.

An example of operations of the device control system 1 according to the first embodiment will now be described. FIG. 7 is a view illustrating an example of operations of the device control system 1 according to the first embodiment.

As illustrated in FIG. 7, in step S101, the terminal apparatus 200 accepts a recipe search operation from the user.

In step S102, the terminal apparatus 200 transmits a HRR request that requests the provision of a recipe (HRR) to the recipe distribution server 300.

In step S103, the recipe distribution server 300 reads out the HRR that corresponds to the HRR request from the terminal apparatus 200.

In step S104, the HRR that was read out is transmitted by the recipe distribution server 300 to the terminal apparatus 200. A recipe ID is associated with the HRR.

In step S105, the terminal apparatus 200 accepts a device control operation from the user.

In step S106, the terminal apparatus 200 transmits a control request that requests control of the device 100 to the device control server 400. A recipe ID and a device ID are associated with the control request.

In step S107, the device control server 400 reads out (acquires) the MRR corresponding to the control request from the terminal apparatus 200.

In step S108, the device control server 400 reads the MRR that was read out.

In step S109, based on the result of reading the MRR, the device control server 400 extracts an action (action ID) which the device 100 is capable of executing from the MRR, and generates a control command for setting execution of the extracted action.

In step S110, the device control server 400 transmits the generated control command to the terminal apparatus 200.

In step S111, the terminal apparatus 200 receives the control command from the device control server 400, and transfers the received control command to the device 100.

In step S112, the device 100 accepts an action starting operation from the user.

In step S113, the device 100 executes the action that corresponds to the control command acquired from the terminal apparatus 200.

Modification of First Embodiment

In the above-described first embodiment, an example in which the terminal apparatus 200 transfers a control command from the device control server 400 to the device 100 is described. However, the device control server 400 may transmit a control command to the device 100, without transmitting the control command by way of the terminal apparatus 200. In such a case, destination information (address information) of the device 100 may be registered in advance in the device control server 400, or the destination information (address information) of the device 100 may be notified to the device control server 400 by a control request from the terminal apparatus 200.

Figure 8:
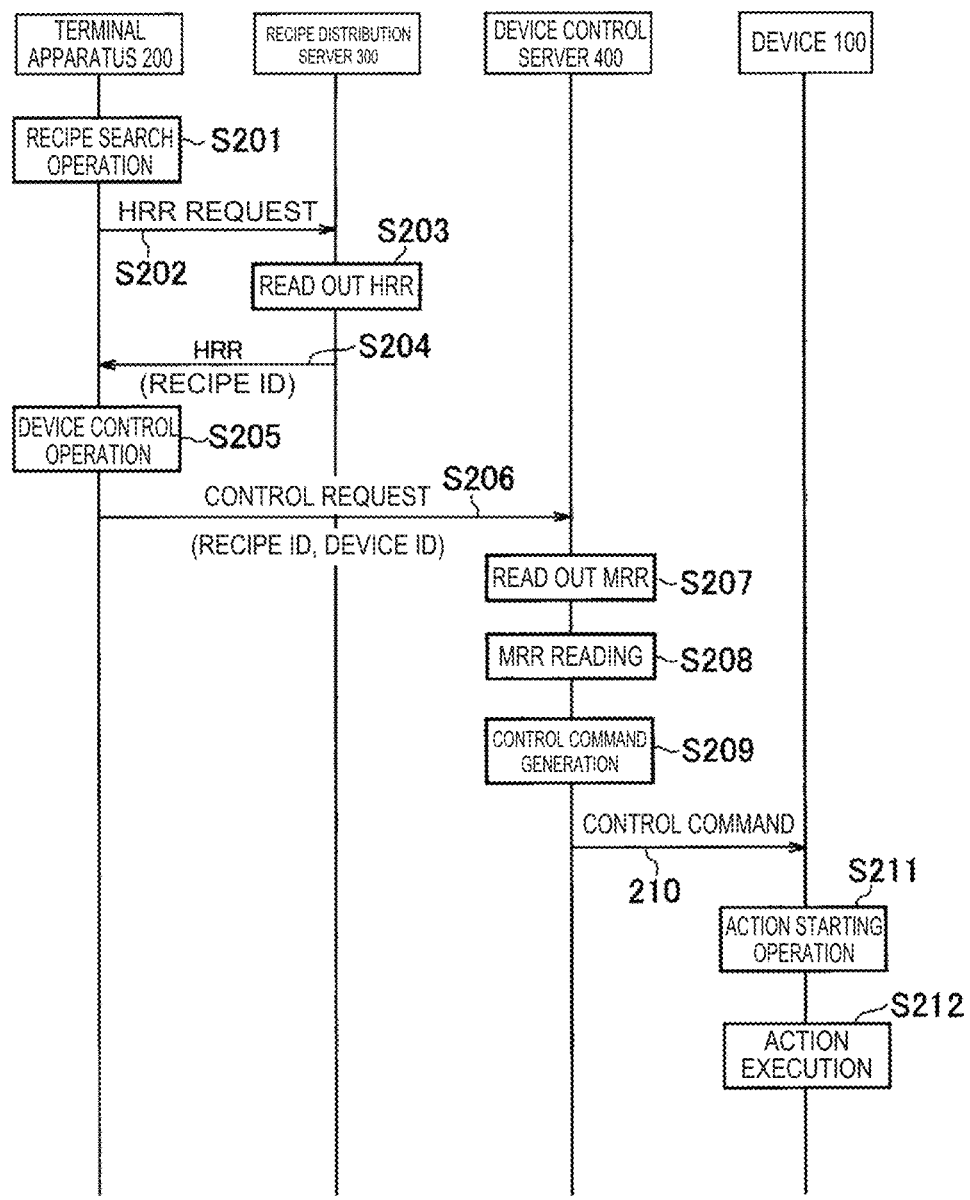
FIG. 8 is a view illustrating an example of operations of a device control system according to a modification of the first embodiment.

FIG. 8 is a view for describing an example of operations of the device control system 1 according to the present modification. FIG. 7 is a view that illustrates an example of operations of the device control system 1 according to the present modification As illustrated in FIG. 8, the respective processing operations from step S201 to step S209 are the same as the respective processing operations from step S201 to step S209 in FIG. 7.

In step S210, the device control server 400 transmits the generated control command to the device 100. The device 100 receives the control command from the device control server 400.

In step S211, the device 100 accepts an action starting operation from the user.

In step S212, the device 100 executes the action that corresponds to the control command acquired from the device control server 400.

Second Embodiment

For the description of the second embodiment, the points in which the second embodiment differs from the first embodiment are mainly described.

In the above-described first embodiment, an example in which the device control server 400 reads the MRR was described. In contrast, in the second embodiment, the device control server 400 transmits (delivers) an MRR to the terminal apparatus 200 without reading the MRR that was read out. The terminal apparatus 200 reads the MRR acquired from the device control server 400.

(Functional Block Configuration of Terminal Apparatus According to Second Embodiment)

Figure 9:
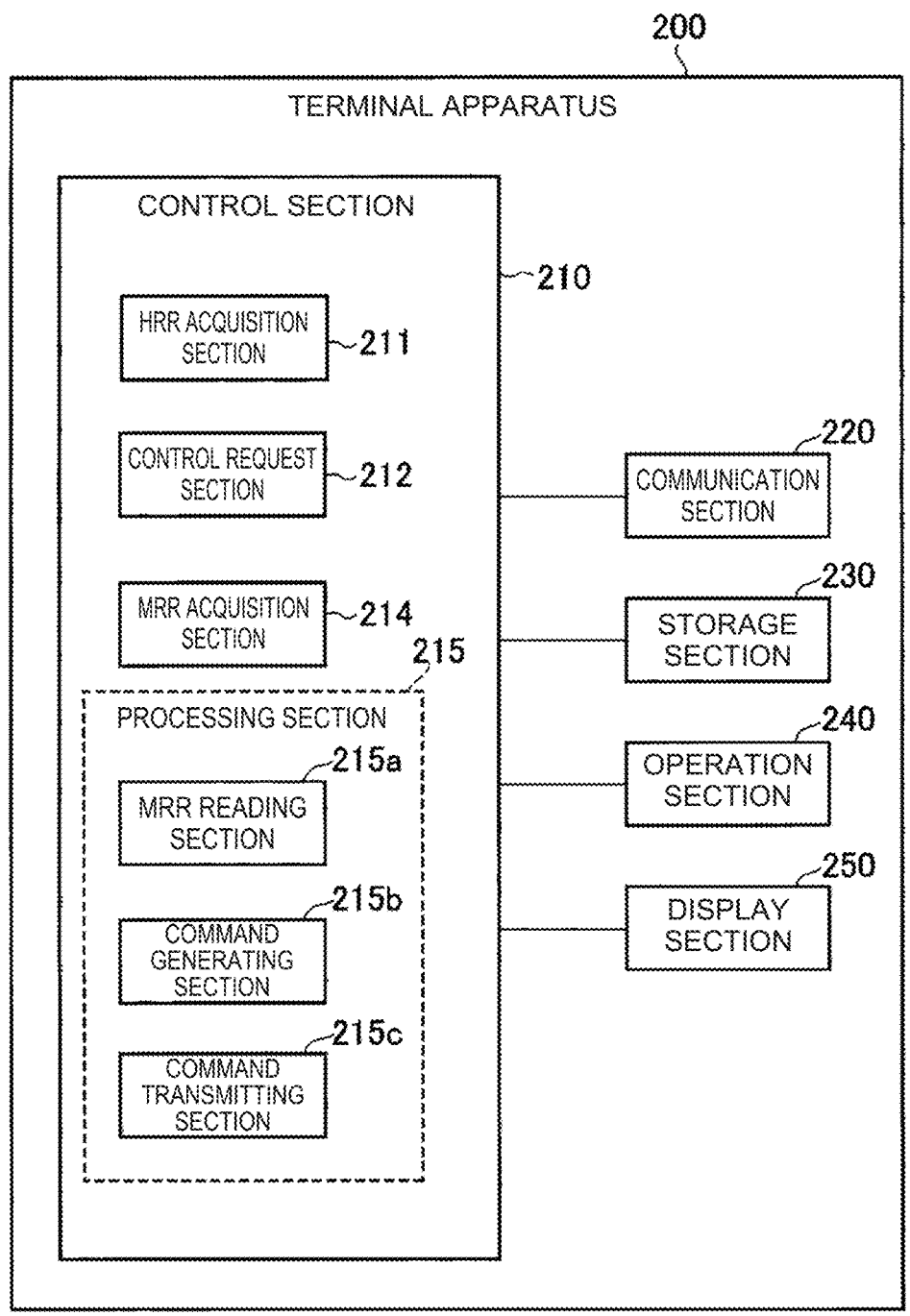
FIG. 9 is a view illustrating a functional block configuration of a terminal apparatus according to the second embodiment.

A functional block configuration of the terminal apparatus 200 according to the second embodiment will now be described. FIG. 9 is a view that illustrates the functional block configuration of the terminal apparatus 200 according to the second embodiment.

As illustrated in FIG. 9, in common with the terminal apparatus 200 of the first embodiment, the terminal apparatus 200 of the second embodiment includes a control section 210, a communication section 220, a storage section 230, an operation section 240 and a display section 250.

The control section 210 according to the second embodiment includes a HRR acquisition section 211, a control request section 212, an MRR acquisition section 214 and a processing section 215. The HRR acquisition section 211 and the control request section 212 are the same as in the first embodiment.

The MRR acquisition section 214 acquires an MRR from the device control server 400.

The processing section 215 reads the MRR acquired by the MRR acquisition section 214, and performs processing for controlling the device 100 that is the control object. The processing section 215 includes an MRR reading section 215a, a command generating section 215b and a command transmitting section 215c.

The MRR reading section 215a reads the MRR acquired by the MRR acquisition section 214.

Based on the result of reading the MRR obtained by the MRR reading section 215a, the command generating section 215b extracts an action (action ID) which the device 100 that is the control object is capable of executing from the MRR, and generates a control command for setting execution of the extracted action. For example, a list of executable actions (action IDs) is defined for each device ID, and by referring to the list, the command generating section 215b extracts an action (action ID) which the device 100 that is the control object is capable of executing from the MRR.

The command transmitting section 215c transmits the command which was generated by the command generating section 215b to the device 100 through the communication section 220.

(Example of Operations According to Second Embodiment)

Figure 10:
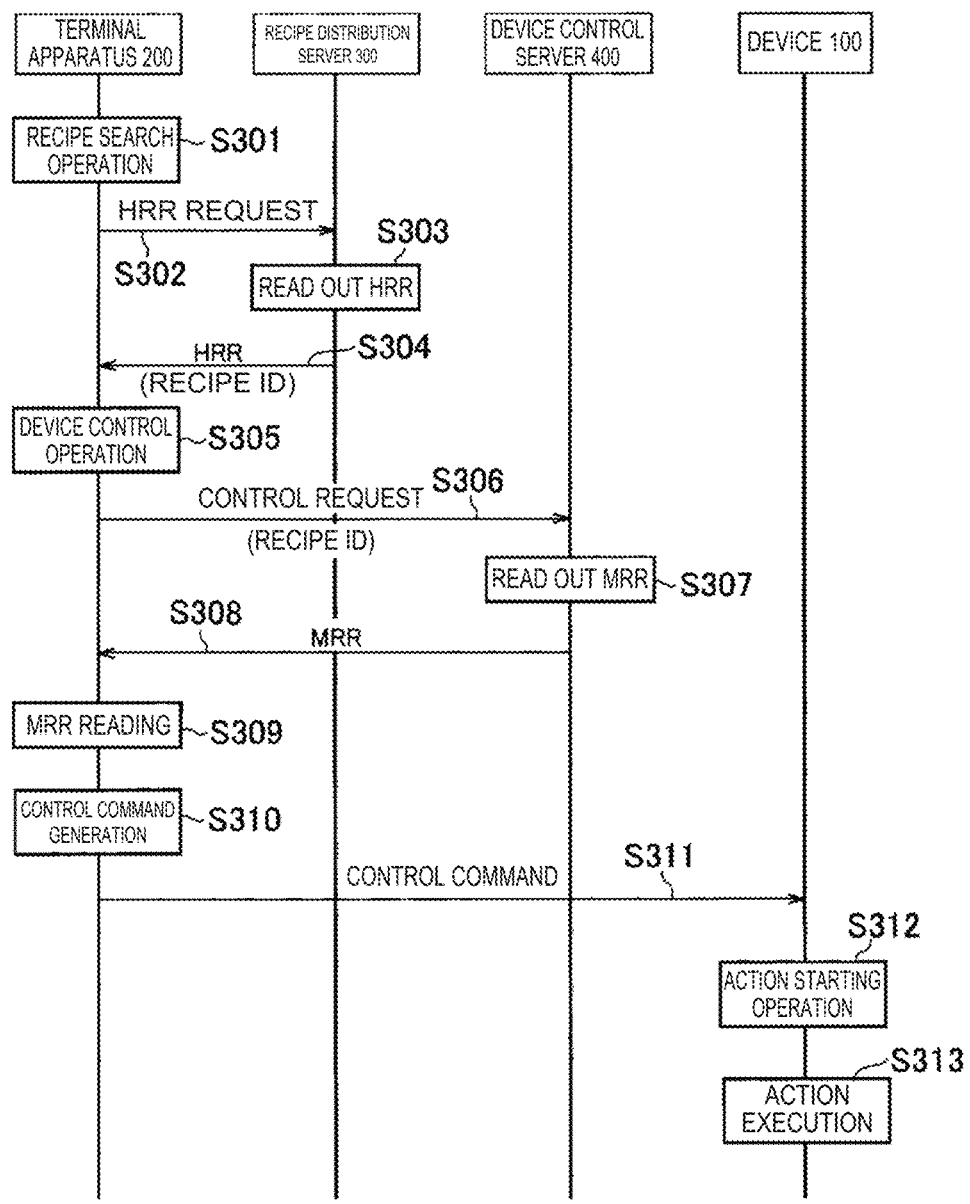
FIG. 10 is a view illustrating an example of operations of the device control system according to the second embodiment.

An example of operations of the device control system 1 according to the second embodiment will now be described. FIG. 10 is a view illustrating an example of operations of the device control system 1 according to the second embodiment.

As illustrated in FIG. 10, in step S301, the terminal apparatus 200 accepts a recipe search operation from the user.

In step S302, the terminal apparatus 200 transmits a HRR request that requests the provision of a recipe (HRR) to the recipe distribution server 300.

In step S303, the recipe distribution server 300 reads out the HRR that corresponds to the HRR request from the terminal apparatus 200.

In step S304, the HRR that was read out is transmitted by the recipe distribution server 300 to the terminal apparatus 200. A recipe ID is associated with the HRR.

In step S305, the terminal apparatus 200 accepts a device control operation from the user.

In step S306, the terminal apparatus 200 transmits a control request that requests control of the device 100 to the device control server 400. A recipe ID is associated with the control request.

In step S307, the device control server 400 reads out the MRR corresponding to the control request from the terminal apparatus 200.

In step S308, the MRR that was read out is transmitted (delivered) by the device control server 400 to the terminal apparatus 200.

In step S309, the terminal apparatus 200 reads the MRR that was acquired from the device control server 400.

In step S310, based on the result of reading the MRR, the terminal apparatus 200 extracts an action (action ID) which the device 100 is capable of executing from the MRR, and generates a control command for setting execution of the extracted action.

In step S311, the terminal apparatus 200 transmits the generated control command to the device 100.

In step S312, the device 100 accepts an action starting operation from the user.

In step S313, the device 100 executes the action that corresponds to the control command acquired from the terminal apparatus 200.

Third Embodiment

For the description of the third embodiment, the points in which the third embodiment differs from the first embodiment are mainly described.

In the above-described first embodiment, an example in which the device control server 400 reads the MRR was described. In contrast, in the third embodiment, the device control server 400 transmits (delivers) an MRR to the terminal apparatus 200 without reading the MRR that was read out. The terminal apparatus 200 transfers the MRR from the device control server 400 to the device 100. The device 100 reads the MRR acquired from the terminal apparatus 200.

(Functional Block Configuration of Device According to Third Embodiment)

Figure 11:
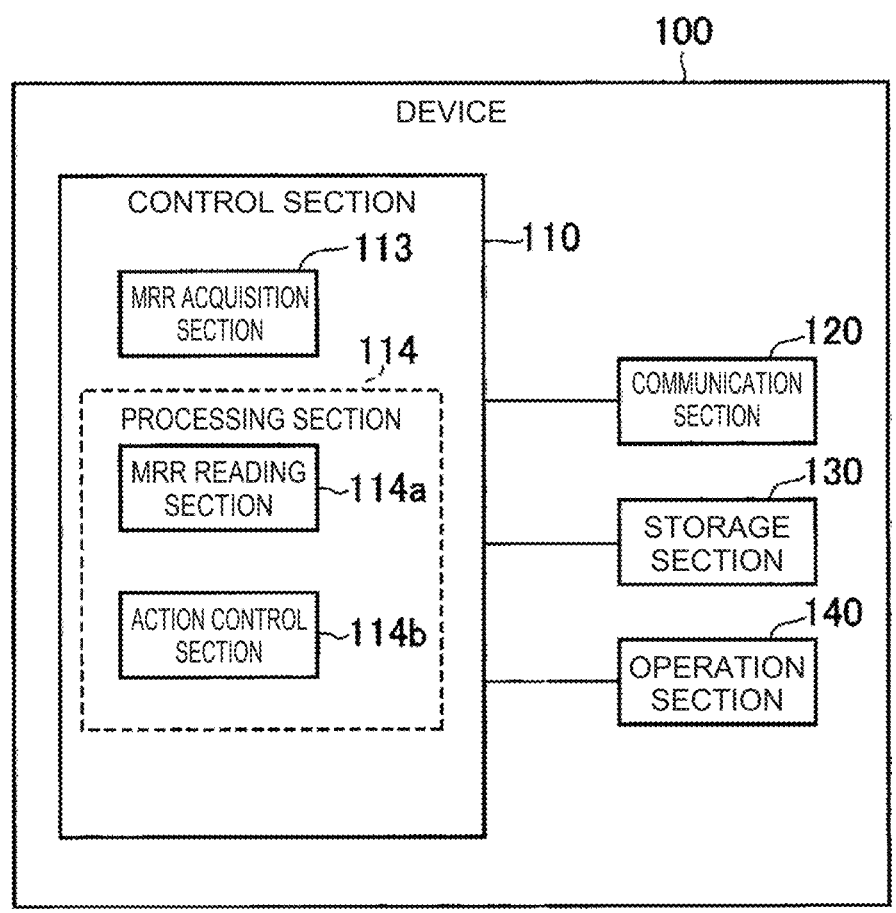
FIG. 11 is a view illustrating a functional block configuration of a device according to the third embodiment.

A functional block configuration of the device 100 according to the third embodiment will now be described. FIG. 11 is a view that illustrates the functional block configuration of the device 100 according to the third embodiment.

As illustrated in FIG. 11, in common with the first embodiment, the device 100 includes a control section 110, a communication section 120, a storage section 130, and an operation section 140.

The control section 110 according to the third embodiment includes an MRR acquisition section 113 and a processing section 114.

The MRR acquisition section 113 acquires an MRR from the terminal apparatus 200.

The processing section 114 reads the MRR acquired by the MRR acquisition section 113, and performs processing for controlling its own device 100. The processing section 114 includes an MRR reading section 114a and an action control section 114b.

The MRR reading section 114a reads the MRR acquired by the MRR acquisition section 113, and based on the reading result, extracts an action (action ID) which its own device 100 is capable of executing from the MRR. For example, a list of executable actions (action IDs) is defined for each device ID, and by referring to the list, the MRR reading section 114a extracts an action (action ID) which its own device 100 is capable of executing from the MRR.

After an action is extracted by the MRR reading section 114a, the action control section 114b controls so as to start the relevant action in response to the operation section 140 (action starting button) being operated by the user.

(Example of operations according to third embodiment)

Figure 12:
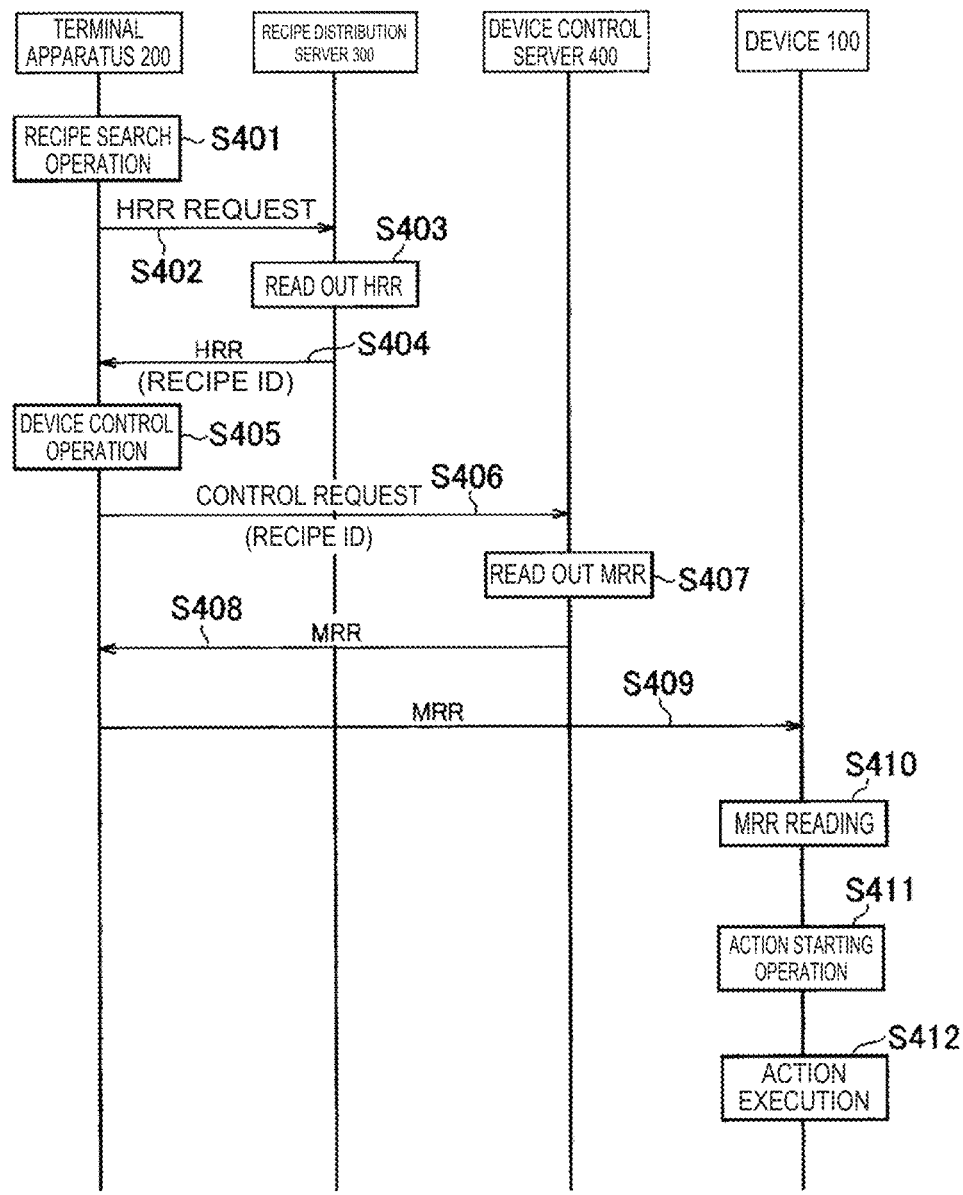
FIG. 12 is a view illustrating an example of operations of the device control system according to the third embodiment.

An example of operations of the device control system 1 according to the third embodiment will now be described. FIG. 12 is a view illustrating an example of operations of the device control system 1 according to the third embodiment.

As illustrated in FIG. 10, in step S401, the terminal apparatus 200 accepts a recipe search operation from the user.

In step S402, the terminal apparatus 200 transmits a HRR request that requests the provision of a recipe (HRR) to the recipe distribution server 300.

In step S403, the recipe distribution server 300 reads out the HRR that corresponds to the HRR request from the terminal apparatus 200.

In step S404, the HRR that was read out is transmitted by the recipe distribution server 300 to the terminal apparatus 200. A recipe ID is associated with the HRR.

In step S405, the terminal apparatus 200 accepts a device control operation from the user.

In step S406, the terminal apparatus 200 transmits a control request that requests control of the device 100 to the device control server 400. A recipe ID is associated with the control request.

In step S407, the device control server 400 reads out the MRR corresponding to the control request from the terminal apparatus 200.

In step S408, the MRR that was read out is transmitted (delivered) by the device control server 400 to the terminal apparatus 200.

In step S409, the terminal apparatus 200 transfers the MRR that was acquired from the device control server 400 to the device 100.

In step S410, the device 100 reads the MRR acquired from the terminal apparatus 200, and extracts an action (action ID) which its own device 100 is capable of executing from the MRR.

In step S411, the device 100 accepts an action starting operation from the user.

In step S412, the device 100 executes the action extracted from the MRR.

Modification of Third Embodiment

In the above-described third embodiment, an example in which the terminal apparatus 200 transfers an MRR from the device control server 400 to the device 100 is described. However, the device control server 400 may transmit an MRR to the device 100, without transmitting the MRR by way of the terminal apparatus 200. In such a case, destination information (address information) of the device 100 may be registered in advance in the device control server 400, or the destination information (address information) of the device 100 may be notified to the device control server 400 by a control request from the terminal apparatus 200.

Figure 13:
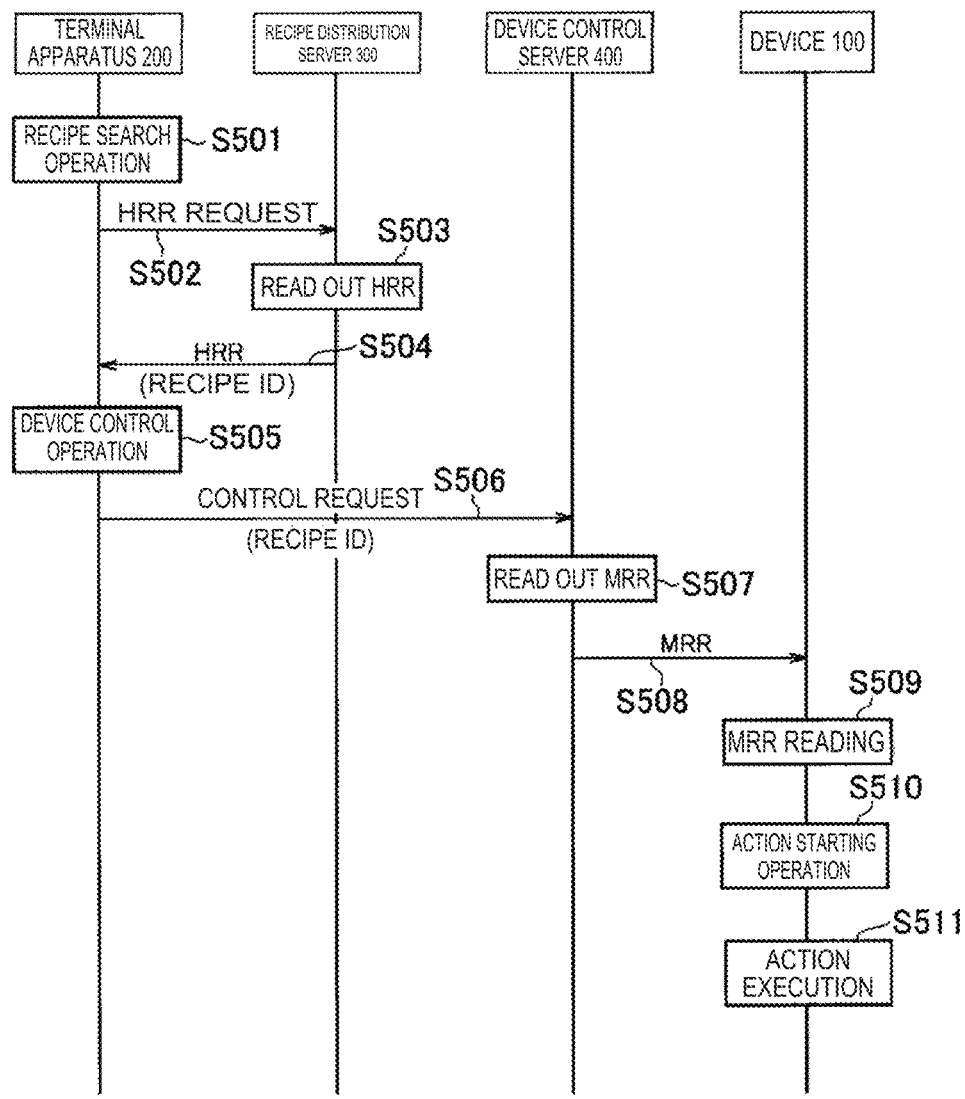
FIG. 13 is a view illustrating an example of operations of a device control system according to a modification of the third embodiment.

FIG. 13 is a view for describing an example of operations of the device control system 1 according to the present modification. FIG. 13 is a view that illustrates an example of operations of the device control system 1 according to the present modification.

As illustrated in FIG. 13, the respective processing operations from step S501 to step S507 are the same as the respective processing operations from step S401 to step S407 in FIG. 12.

In step S508, the MRR that was read out is transmitted (delivered) by the device control server 400 to the device 100.

In step S509, the device 100 reads the MRR acquired from the device control server 400, and extracts an action (action ID) which its own device 100 is capable of executing from the MRR.

In step S510, the device 100 accepts an action starting operation from the user.

In step S511, the device 100 executes the action extracted from the MRR.

Other Embodiments

Although embodiments have been described above, it should not be understood that the present disclosure is limited by the statements and the drawings constituting a part of the present disclosure. From this disclosure, various alternative embodiments, examples, and operational technologies will become apparent to those skilled in the art.

In the above-described embodiments, an example is described in which the device control system 1 includes the terminal apparatus 200. However, in a case where the device 100 is capable of communicating with the recipe distribution server 300 and the device control server 400, and the device 100 has a user interface such as a touch panel, the terminal apparatus 200 may not be necessary. In such a case, in the above-described first embodiment and third embodiment, the operations performed by the terminal apparatus 200 may be performed by the device 100 instead of the terminal apparatus 200.

In the above-described embodiments, an example in which the recipe distribution server 300 and the device control server 400 are separate server apparatuses is described. However, a configuration may be adopted in which a single server apparatus is provided with the respective functions of the recipe distribution server 300 and the device control server 400 to thereby integrate the recipe distribution server 300 and the device control server 400 into a single server apparatus.

A program for causing a computer to execute each processing operation performed by the device control system 1 may be provided. Further, the program may be recorded on a computer-readable medium. When the computer-readable medium is used, it is possible to install the program in a computer. Here, the computer-readable medium having the program recorded thereon may be a non-transitory recording medium. The non-transitory recording medium is not particularly limited, and for example the non-transitory recording medium may be a recording medium such as a CD-ROM or a DVD-ROM.

REFERENCE SIGNS LIST

1: device control system
10: communication network
21: CPU
22: RAM
23: ROM
24: auxiliary storage apparatus
25: communication module
26: input apparatus
27: output apparatus
28: mechanism
30: recipe distribution server
110: control section
111: command acquisition section
112: action control section
113: MRR acquisition section
114: processing section
114a: MRR reading section
114b: action control section
120: communication section
130: storage section
140: operation section
200: terminal apparatus
210: control section
211: HRR acquisition section
212: control request section
213: command transferring section
214: MRR acquisition section
215: processing section
215a: MRR reading section
215b: command generating section
215c: command transmitting section
220: communication section
230: storage section
240: operation section
250: display section
300: recipe distribution server
400: device control server
410: control section
411: request accepting section
412: MRR acquisition section
413: processing section
413a: MRR reading section
413b: command generating section
413c: command transmitting section
420: communication section
430: storage section

The invention claimed is:

1. A device control system, comprising:
a memory; and
processing circuitry configured to
acquire recipe data of a culinary dish, the recipe data being represented by a graph including a plurality of nodes and edges between the nodes;
store, in the memory, the acquired recipe data; and
process the acquired recipe data for controlling a device, wherein
the plurality of nodes include
an ingredient node that is a starting point of the graph and that represents an ingredient of the culinary dish, and
a culinary dish node that is an ending point of the graph and that represents the culinary dish,
each edge represents an action that is necessary for state transition between the nodes,
an ingredient identifier (ID) that uniquely identifies the ingredient is assigned to the ingredient node,
an action ID that uniquely identifies the action is assigned to the edge,
the processing circuitry is further configured to control the device based on the acquired recipe data represented by the graph including the ingredient node having the ingredient ID, the culinary dish node, and the edges each having the action ID,
the processing circuitry processes the acquired recipe data by reading the acquired recipe data to identify a particular action ID corresponding to a particular action executable by the device, and
the processing circuitry controls the device to execute the particular action corresponding to the particular action ID.

2. The device control system according to claim 1, wherein the plurality of nodes further include an intermediate node that represents a state of the ingredient during a process until the culinary dish is completed.

3. The device control system according to claim 1, wherein a condition for ending the action is assigned to the edge as an attribute of the edge.

4. The device control system according to claim 1, wherein an order among edges is assigned to the edge as an attribute of the edge.

5. The device control system according to claim 1, wherein the plurality of nodes further include a waste node that represents waste material which is a part of the ingredient that is not used in the culinary dish.

6. The device control system according to claim 1, comprising:
a terminal having communication circuitry configured to communicate with a server, the memory and the processing circuitry, wherein
the processing circuitry is configured to acquire the recipe data from the server.

7. The device control system according to claim 1, wherein
the device has communication circuitry configured to communicate with a server or a terminal apparatus, and
the communication circuitry is configured to acquire the recipe data from the server or the terminal apparatus.

8. The device control system according to claim 1, wherein the device control system is a server.

9. The device control system according to claim 1, wherein the processing circuitry is configured to control the device to cook the culinary dish based on the acquired recipe data.

10. The device control system according to claim 1, wherein the processing circuitry is configured to control the device to perform the action identified by the action ID.

11. The device control system according to claim 3, wherein the processing circuitry is configured to:
control the device to perform the action identified by the action ID; and
end the action based on the condition for ending the action.

12. The device control system according to claim 4, wherein the processing circuitry is configured to control the device to perform each of the action identified by the action ID in accordance with the order among edges.

13. A device control method, comprising:
acquiring recipe data of a culinary dish, the recipe data being represented by a graph including a plurality of nodes and edges between the nodes;
storing, in a memory, the acquired recipe data; and
processing, using processing circuitry, the acquired recipe data for controlling a device, wherein
the plurality of nodes include
an ingredient node that is a starting point of the graph and that represents an ingredient of the culinary dish, and
a culinary dish node that is an ending point of the graph and that represents the culinary dish,
each edge represents an action that is necessary for state transition between the nodes,
an ingredient identifier (ID) that uniquely identifies the ingredient is assigned to the ingredient node,
an action ID that uniquely identifies the action is assigned to the edge, and
the device control method further comprises:
controlling the device, using the processing circuitry, based on the acquired recipe data represented by the graph including the ingredient node having the ingredient ID, the culinary dish node, and the edges each having the action ID;
processing the acquired recipe data by reading the acquired recipe data to identify a particular action ID corresponding to a particular action executable by the device; and
controlling the device to execute the particular action corresponding to the particular action ID.

14. A non-transitory computer readable medium storing computer executable instructions which, when executed by processing circuitry of a computer, cause the computer to:
acquire recipe data of a culinary dish, the recipe data being represented by a graph including a plurality of nodes and edges between the nodes;
store, in a memory, the acquired recipe data; and
process the acquired recipe data for controlling a device, wherein
the plurality of nodes include
an ingredient node that is a starting point of the graph and that represents an ingredient of the culinary dish, and
a culinary dish node that is an ending point of the graph and that represents the culinary dish,
each edge represents an action that is necessary for state transition between the nodes,
an ingredient identifier (ID) that uniquely identifies the ingredient is assigned to the ingredient node,
an action ID that uniquely identifies the action is assigned to the edge, and
the computer is further caused to:
control the device based on the acquired recipe data represented by the graph including the ingredient node having the ingredient ID, the culinary dish node, and the edges each having the action ID;
process the acquired recipe data by reading the acquired recipe data to identify a particular action ID corresponding to a particular action executable by the device; and
control the device to execute the particular action corresponding to the particular action ID.

* * * * *